(No Model.)
R. W. HENT.
ROLLER BEARING.
No. 411,500. Patented Sept. 24, 1889.
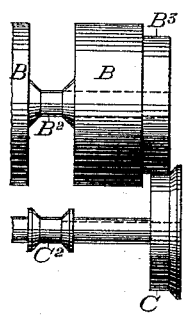
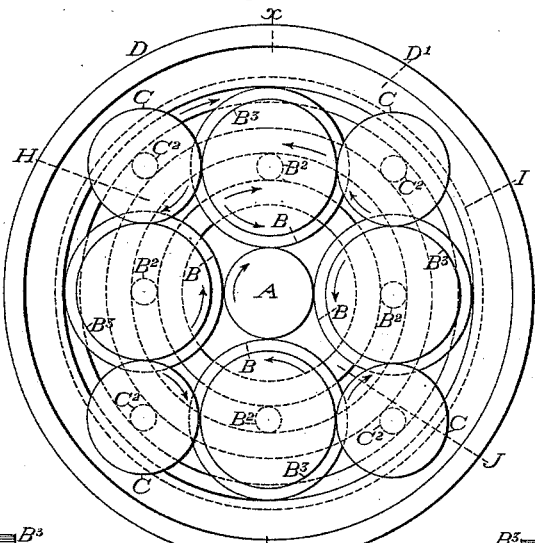
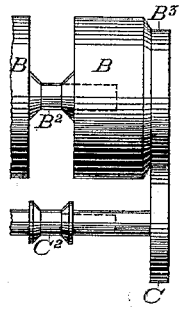
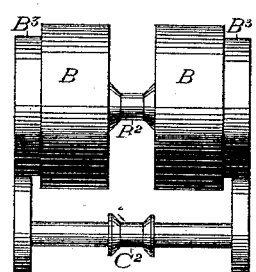
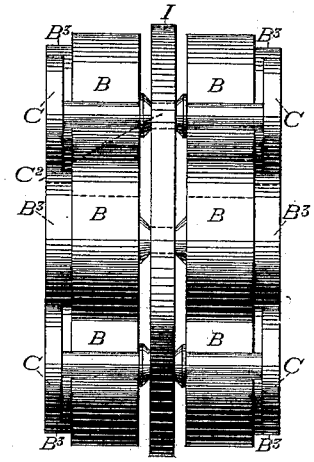
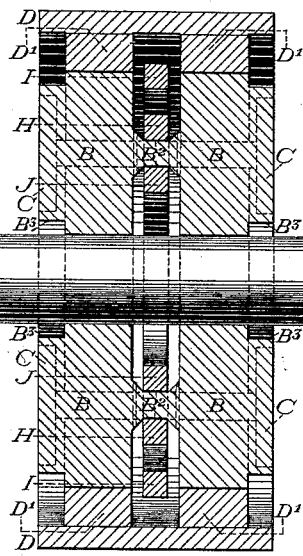
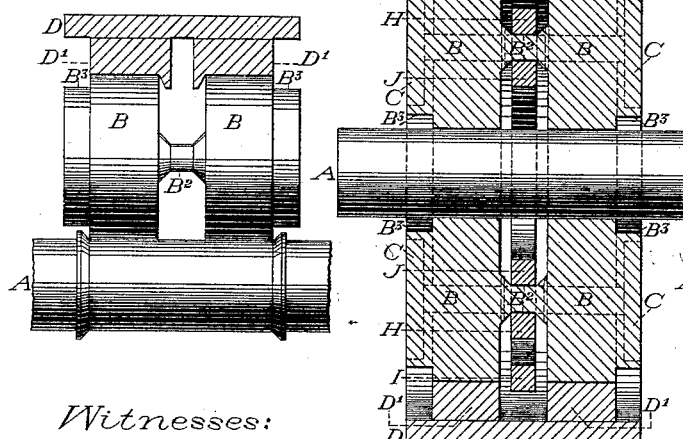
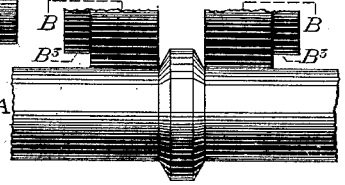
Witnesses:
Nathaniel Holland
John A. Wall
Inventor:
Reuben W. Hent

UNITED STATES PATENT OFFICE.

REUBEN W. HENT, OF SAN FRANCISCO, CALIFORNIA.

ROLLER-BEARING.

SPECIFICATION forming part of Letters Patent No. 411,500, dated September 24, 1889.

Application filed February 23, 1889. Serial No. 300,887. (No model.)

*To all whom it may concern:*

Be it known that I, REUBEN W. HENT, a citizen of the United States, residing in the city and county of San Francisco, and State of California, have invented a certain new and useful Improvement in Roller-Bearings, of which the following is a specification.

My invention is an improvement on my roller-bearing shown and described in my application for patent, filed December 19, 1888, Serial No. 294,044, in which a ring bears at its inner side on journals of a series of bearing-rollers bearing directly on and projecting beyond sleeves upon the shaft and sleeves within the casing and at its periphery on journals of a series of separating-rollers bearing only on the projections of the bearing-rollers, keeping the latter separate from each other, and a smaller or inner ring bears at its periphery on journals of the bearing-rollers, and a larger or outer ring bears at its inner side on journals of the separating-rollers. In said roller-bearing, the observance of proportions to reduce or avoid sliding friction necessitates sleeves within the casing (or a bearing-casing) shorter than the bearing-rollers to provide room for the operation of the separating-rollers, and such sleeves or bearing-casing necessitate sleeves upon the shaft (or a central journal of larger diameter than the shaft) between the same planes as said sleeves within the casing or said bearing-casing to secure evenness of wear of the bearing-rollers. Incidentally the employment of these sleeves to permit the projection of these rollers also secures bearings for the separating-rollers, which are exempt from substantial wear.

The object of my improvement is to provide a construction which, while it will secure evenness of wear of the bearing-rollers and preserve from substantial wear those portions of the latter rollers which bear on the separating-rollers, as in my said roller-bearing, will permit the central journal to be made of the same diameter as the shaft, and consequently the diameter of the bearing-rollers to be comparatively enlarged, thus reducing the rolling friction. This object is attained by providing the bearing-rollers with journals of smaller diameter than said rollers and bearing only on the separating-rollers, and so constructing the latter rollers that they bear only on these smaller journals; in such smaller journals bearing only on the separating-rollers; in such separating-rollers bearing only on said journals; and in the peculiar construction and combinations of the parts hereinafter set forth, consists, essentially, my improvement. It is illustrated in the accompanying drawings, in which—

Figure 1 is an end view of a roller-bearing embodying my improvement. Fig. 2 is a longitudinal section through the center, or on the line *x x*, Fig. 1. Fig. 3 is a side view of a bearing-roller and a separating-roller, showing the relative positions of the rollers as seen along the plane tangent to both. Fig. 4 is a side view of my improved roller-bearing as it appears after the removal of the shaft and casing. Figs. 5, 6, 7, and 8 are views showing means of retaining the several parts in their proper longitudinal positions.

A represents the shaft or central journal; B, the bearing-rollers; $B^2$ and $B^3$, the journals of the rollers B; C, the separating-rollers; $C^2$, the journals of the rollers C; D, the casing; D′, the sleeves within the casing; and H, I, and J, the rings, I representing the larger or outer, J the smaller or inner, and H the intermediate ring.

The sleeves D′, of the same length and between the same planes as the rollers B, are fitted closely within the casing D, and with those portions of the latter within which they are fitted constitute the bearing-casing. The rollers B bear directly on the bearing-casing and the shaft A. The journals $B^2$ are formed at the longitudinal centers of the rollers B and bear on the inner side of the ring H and on the periphery of the ring J. The journals $C^2$ are formed at the longitudinal centers of the rollers C and bear on the periphery of the ring H and on the inner side of the ring I. The journals $B^3$ are of smaller diameter than the rollers B, are formed at the ends of the latter, and are adapted to bear only on the rollers C. The rollers C, keeping the rollers B separate from each other, are adapted to bear only on the journals $B^3$, each roller C on and between the journals $B^3$ of two rollers B, those portions of the rollers C bearing on the latter journals being of such diameter that they do not touch the casing D, and those portions not bearing thereon being reduced in diameter, so as not to touch the rollers B or the sleeves D'. The ring H is interposed between and bears on the journals C² at its periphery and the journals B² at its inner side. The ring I bears at its inner side on the journals C², and the ring J bears at its periphery on the journals B². The arrow-heads indicate the relative directions when the casing is stationary of the axial rotations of the shaft and rollers and of the rings caused by the axial rotations of the journals B² and C².

The proportions, by the observance of which sliding friction may be avoided, are as follows: If the diameters of the journals B² and C² are equal, as shown in the drawings and as is preferable, then the diameter of the journals B³ is to the diameter of the rollers C as the outer diameter of the ring H is to its inner diameter. If the diameters of the journals B³ and the rollers C are equal, then the diameter of the journals C² is to the diameter of the journals B² as the outer diameter of the ring H is to its inner diameter; and if neither the diameters of the journals B² and C² nor the diameters of the journals B³ and the rollers C are equal, then the outer diameter of the ring H, divided by the diameter of a journal C², (equaling the number of its rotations,) multiplied by the circumference of a roller C, equals the inner diameter of the ring H, divided by the diameter of a journal B², (equaling the number of its rotations,) multiplied by the circumference of a journal B³, an equation to which all the anti-friction proportions are reducible. The journals B³ also permitting enlarged diameters of the rollers C, the speed of the axial rotations of all the journals, and consequently of the rings, is greatly reduced, and their rolling friction and liability to wear correspondingly lessened. These journals B³ are substitutes for the projections of the rollers beyond the sleeves in my said roller-bearing, (application Serial No. 294,044,) being themselves mere projections of smaller diameter than the rollers. Like said projections, they are exempt from all pressure of the load, and therefore substantially from wear and changes in their dimensions, and the other journals and all the rings performing the same functions in this improved roller-bearing, as in said roller-bearing, and retaining substantially their original dimensions, provided said anti-friction proportions are observed, as is preferable, and no more than four rollers B are employed, (for which reason the number of rollers B is preferably limited to four,) it follows that the two series of rollers will be held and kept compactly and exactly in their proper relative positions whatever the wear and changes in the dimensions of the parts substantially subject thereto.

The journals B³ necessarily constitute an improvement in the respects hereinbefore set forth; also on my roller-bearing shown and described in my application for patent filed August 3, 1888, Serial No. 281,880, in which the rings H and I are the only rings employed. The several parts may be kept in their proper longitudinal positions by collars and flanges, as shown in Figs. 5, 6, 7, and 8, or by any equivalent means. The collars and flanges are preferably beveled, as shown in the drawings, all sliding friction between end surfaces being thereby avoided. All the journals B² and C² may be formed separate from and securely and rigidly attached to the rollers B and C, respectively; or all or any of them (except, of course, those necessarily removable to permit their insertion between the rings) may be formed integral with the rollers. The removable portions of the rollers are preferably attached by slipping them as sleeves over extensions of the journals, as shown in Figs. 5 and 6. The journals B³ and sleeves D' also may be formed either separate from and fastened to or integral with the rollers B and casing D, respectively.

I claim as my invention—

1. In a roller-bearing, the combination of a series of bearing-rollers having journals of smaller diameter than said rollers, and a series of separating-rollers adapted to bear only on said journals with a ring bearing at its periphery on journals of the separating-rollers, and at its inner side on journals of the bearing-rollers, all substantially as and for the purposes set forth.

2. In a roller-bearing, a series of rollers B, having journals B², and the journals B³, of smaller diameter than the rollers B, and a series of rollers C, bearing only on the journals B³ and having journals C², in combination with a ring H, bearing at its periphery on the journals C² and at its inner side on the journals B², all substantially as shown and described, and for the purposes set forth.

3. In a roller-bearing, the combination, with the central journal and the bearing-casing, of a series of bearing-rollers bearing thereon, having journals of smaller diameter than said rollers and bearing only on a series of separating-rollers keeping the bearing-rollers separate from each other, the said series of separating-rollers bearing only on said journals, and a ring bearing at its periphery on journals of the separating-rollers, and at its inner side on journals of the bearing-rollers, all substantially as and for the purposes set forth.

4. A roller-bearing comprising the shaft A, the casing D, the sleeves D', the series of rollers B, of the same length and between the same planes as the sleeves D' and having journals B², and the journals B³, of smaller diameter than the rollers B, the series of rollers C, bearing only on the journals B³ and having journals C², and a ring H, bearing at its periphery on the journals C² and at its inner side on the journals B², all constructed, arranged, combined, and adapted to operate substantially as shown and described, and for the purposes set forth.

5. In a roller-bearing, the combination of a series of bearing-rollers having journals of smaller diameter than said rollers, and a series of separating-rollers adapted to bear only on said journals, with a ring bearing at its periphery on journals of the separating-rollers and at its inner side on journals of the bearing-rollers, and a ring bearing at its inner side on said journals of the separating-rollers, all substantially as and for the purposes set forth.

6. In a roller-bearing, a series of rollers B, having journals $B^2$, and the journals $B^3$, of smaller diameter than the rollers B, and a series of rollers C, bearing only on the journals $B^3$ and having journals $C^2$, in combination with a ring H, bearing at its periphery on the journals $C^2$ and at its inner side on the journals $B^2$, and a ring I, bearing at its inner side on the journals $C^2$, all substantially as shown and described, and for the purposes set forth.

7. In a roller-bearing, the combination, with the central journal and the bearing-casing, of a series of bearing-rollers bearing thereon, having journals of smaller diameter than said rollers and bearing only on a series of separating-rollers, keeping the bearing-rollers separate from each other, the said series of separating-rollers bearing only on said journals, a ring bearing at its periphery on journals of the separating-rollers and at its inner side on journals of the bearing-rollers, and a ring bearing at its inner side on said journals of the separating-rollers, all substantially as and for the purposes set forth.

8. A roller-bearing comprising the shaft A, the casing D, the sleeves D', the series of rollers B, of the same length and between the same planes as the sleeves D' and having journals $B^2$, and the journals $B^3$, of smaller diameter than the rollers B, the series of rollers C, bearing only on the journals $B^3$ and having journals $C^2$, a ring H bearing at its periphery on the journals $C^2$ and at its inner side on the journals $B^2$, and a ring I, bearing at its inner side on the journals $C^2$, all constructed, arranged, combined, and adapted to operate substantially as shown and described, and for the purposes set forth.

9. In a roller-bearing, the combination of a series of bearing-rollers having journals of smaller diameter than said rollers, and a series of separating-rollers adapted to bear only on said journals, with a ring bearing at its periphery on journals of the separating-rollers and at its inner side on journals of the bearing-rollers, and a ring bearing at its periphery on the latter journals, all substantially as and for the purposes set forth.

10. In a roller-bearing, a series of rollers B, having journals $B^2$, and the journals $B^3$, of smaller diameter than the rollers B, and a series of rollers C, bearing only on the journals $B^3$ and having journals $C^2$, in combination with a ring H, bearing at its periphery on the journals $C^2$ and at its inner side on journals $B^2$, and a ring J, bearing at its periphery on the journals $B^2$, all substantially as shown and described, and for the purposes set forth.

11. In a roller-bearing, the combination, with the central journal and the bearing-casing, of a series of bearing-rollers bearing thereon, having journals of smaller diameter than said rollers and bearing only on a series of separating-rollers, keeping the bearing-rollers separate from each other, the said series of separating-rollers bearing only on said journals, a ring bearing at its periphery on journals of the separating-rollers and at its inner side on journals of the bearing-rollers, and a ring bearing at its periphery on the latter journals, all substantially as and for the purposes set forth.

12. A roller-bearing comprising the shaft A, the sleeves D', the series of rollers B, of the same length and between the same planes as the sleeves D' and having journals $B^2$, and the journals $B^3$, of smaller diameter than the rollers B, the series of rollers C, bearing only on the journals $B^3$ and having journals $C^2$, a ring H, bearing at its periphery on the journals $C^2$, and at its inner side on the journals $B^2$, and a ring J, bearing at its periphery on the journals $B^2$, all constructed, arranged, combined, and adapted to operate substantially as shown and described, and for the purposes set forth.

13. In a roller-bearing, the combination of a series of bearing-rollers having journals of smaller diameter than said rollers, and a series of separating-rollers adapted to bear only on said journals, with a ring bearing at its periphery on journals of the separating-rollers and at its inner side on journals of the bearing-rollers, a ring bearing at its inner side on said journals of the separating-rollers, and a ring bearing at its periphery on the last-named journals of the bearing-rollers, all substantially as and for the purposes set forth.

14. In a roller-bearing, a series of rollers B, having journals $B^2$, and the journals $B^3$, of smaller diameter than the rollers B, and a series of rollers C, bearing only on the journals $B^3$ and having journals $C^2$, in combination with a ring H, bearing at its periphery on the journals $C^2$ and at its inner side on the journals $B^2$, a ring I, bearing at its inner side on the journals $C^2$, and a ring J, bearing at its periphery on the journals $B^2$, all substantially as shown and described, and for the purposes set forth.

15. In a roller-bearing, the combination, with the central journal and the bearing-casing, of a series of rollers bearing thereon having journals of smaller diameter than said rollers and bearing only on a series of separating-rollers, keeping the bearing-rollers separate from each other, the said series of separating-rollers bearing only on said journals, a ring bearing at its periphery on journals of the separating-rollers and at its inner side on journals of the bearing-rollers, a ring bearing at its inner side on said journals of the separating-rollers, and a ring bearing at its periphery on the last-named journals of the bearing-rollers, all substantially as and for the purposes set forth.

16. A roller-bearing comprising the shaft A, the sleeves D', the series of rollers B, of the same length and between the same planes as the sleeves D' and having journals $B^2$, and the journals $B^3$, of smaller diameter than the rollers B, the series of rollers C, bearing only on the journals $B^3$ and having journals $C^2$, a ring H, bearing at its periphery on the journals $C^2$ and at its inner side on the journals $B^2$, a ring I, bearing at its inner side on the journals $C^2$, and a ring J, bearing at its periphery on the journals $B^2$, all constructed, arranged, combined, and adapted to operate substantially as shown and described, and for the purposes set forth.

REUBEN W. HENT.

Witnesses:
NATHANIEL HOLLAND,
JOHN A. WALL.